United States Patent Office 3,134,766
Patented May 26, 1964

3,134,766
AZO DYESTUFFS OF LOW WATER-SOLUBILITY
Ernest Merian, Bottmingen, Basel-Land, Switzerland, Bruno J. R. Nicolaus, Milan, Italy, and Otto Senn, Arlesheim, Basel-Land, and Walter Wehrli, Riehen, Basel, Switzerland, assignors to Sandoz Ltd., Basel, Switzerland
No Drawing. Filed Aug. 11, 1960, Ser. No. 48,831
Claims priority, application Switzerland Aug. 13, 1959
4 Claims. (Cl. 260—186)

This invention relates to new disazo dyestuffs which are of low water-solubility and have the general formula

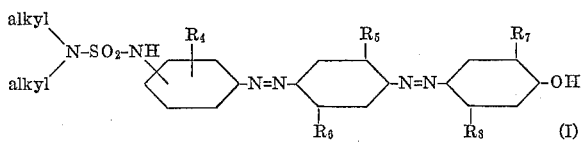 (I)

in which $R_4$ and $R_7$ represent hydrogen, halogen, alkyl or alkoxy,
$R_5$ and $R_8$ represent hydrogen, alkyl or alkoxy, and
$R_6$ represents hydrogen, alkyl, alkoxy, acylamino or alkylsulfonylamino.

The alkyl or alkoxy radicals are throughout of low molecular weight. They have 1 to about 4, or particularly 1 to 2, carbon atoms.

The process for the production of the new azo dyestuffs of low water-solubility consists in coupling in the known manner a diazo or diazo-azo compound free from sulfonic acid and carboxylic acid groups with a couplable hydroxybenzene or amine of the benzene series, the starting products being chosen so that the diazo or coupling component possesses a group of the formula

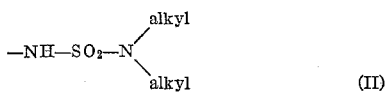 (II)

Preferably 1 mole of the diazo compound is coupled with 1 mole of the coupling component.

The new, sparingly water-soluble azo dyestuffs dye from aqueous dispersion synthetic polyamide fibers such as nylon and Perlon (registered trademark), cellulose ester fibers, e.g. secondary cellulose acetate and triacetate, polyvinyl fibers, polyacrylonitrile fibers which may be modified and polyester fibers, preferably terephthalic acid ester fibers such as Terylene, Dacron, Dacron 64, Kodel and Vycron (registered trademarks) in yellow, orange and red shades. The dyestuffs can also be applied to the same fibers by padding or printing techniques. The dyeings, paddings and printings possess very good fastness to light, gas fumes, washing, perspiration, water and sea water, and are dischargeable. A fairly good reserve of viscose rayon, cotton and wool is obtained, especially on aftertreatment with a hydrosulfite. Where the affinity for cellulose acetate and polyester fibers is sufficient, it is possible to produce on these fibers yellow and orange shades of great depth and of high fastness to light, pleating, sublimation and heat setting. Certain of the new dyestuffs are suitable for coloring lacquers, oils, plastics and artificial fibers in the mass.

Cellulose acetate and triacetate dyed in the dope with these dyestuffs have high fastness to light, washing, perspiration, gas fumes, cross dyeing, alkaline bleaching, oxalic acid, dry cleaning and peroxide bleaching, and excellent fastness to water, sea water, soap baths, crocking, decatizing and pressing.

The dyestuffs of Formula I dye synthetic polyamide fibers, polyester fibers, cellulose ester fibers, polyvinyl fibers and polyacrylonitrile fibers in yellow, orange and red shades of very good fastness. The process for their production consists in coupling the diazo compound of an aminomonoazo dyestuff of the formula

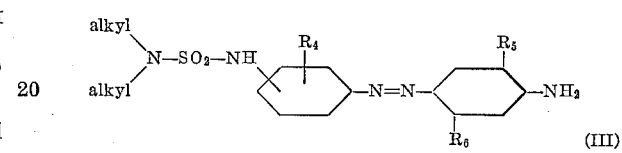 (III)

wherein $R_4$, $R_5$ and $R_6$ possess the aforecited meanings, with a hydroxybenzene of the formula

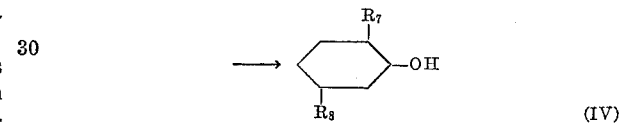 (IV)

wherein $R_7$ and $R_8$ possess the aforecited meanings, this coupling being carried out in the weakly acid, neutral or alkaline pH region, preferably between pH 5 and 12.

In the following examples the parts and the percentages are by weight and the temperatures in degrees centigrade.

EXAMPLE 1

21.5 parts of 1-amino-4-dimethylaminosulfonylaminobenzene are dissolved cold in a mixture of 100 parts of water and 36 parts of 30% hydrochloric acid and diazotized with a solution of 7 parts of sodium nitrite and 20 parts of water at 0°. The so-produced diazo compound is mixed with a solution of 13.7 parts of 1-amino-2-methoxy-5-methylbenzene in 40 parts of 10% hydrochloric acid at 0°. 150 parts of a 50% sodium acetate solution are dropped in. The monoazo dyestuff so formed is filtered off, washed, mixed carefully with 300 parts of water and 25 parts of concentrated hydrochloric acid, and diazotized with 6.9 parts of sodium nitrite in 20% solution. The diazo suspension at 0° is run into a solution of 10 parts of hydroxybenzene, 14 parts of 30% sodium hydroxide solution and 30 parts of sodium carbonate in 200 parts of water. Coupling is completed in a short time. The precipitated red-brown disazo dyestuff is filtered off, washed with water and dried at about 70° with vacuum. If necessary it can be purified, e.g. by re-crystallization from ethanol. Its melting point is 180–183°. The new dyestuff dyes from aqueous dispersion acetate, triacetate, synthetic polyamide and polyester fibers in reddish yellow shades with good light fastness and excellent fastness to washing, perspiration, sea water, gas fumes, sublimation, pleating and cross-dyeing.

The diazo component used in this example is new and is produced as follows:

13.8 parts of 4-nitro-1-aminobenzene are dissolved in 25 parts of pyridine and at 10° 15.7 parts of dimethylaminosulfonic acid chloride are added dropwise. The reaction mass is stirred for 10 hours at room temperature and then added with vigorous stirring to a mixture of 40 parts of technical 30% hydrochloric acid and 80 parts of ice. The precipitated product is filtered off and washed neutral. In the crude state it melts at 127–138° and on re-crystallization from ethyl alcohol at 146°.

The product which is obtained in practically quantitative yield has the constitution:

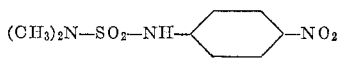

the crude nitro compound obtained is dissolved in 100 parts of ethyl alcohol and reduced in presence of 2 parts of Raney nickel catalyst at 50° with 7.5 liters of hydrogen (theoretical uptake 7.4 liters).

After separation of the catalyst the solution is carefully evaporated in vacuum and then cooled to 0°. The precipitated amino compound is filtered off and dried. It is analytically pure and melts at 122–213°. The reduction proceeds quantitatively and gives the new amino compound in excellent yield and purity.

The following Tables I and II give details of analogous dyestuffs which can be produced by the processes of Example 1. In column A the starting component is listed, in B the intermediary component, in C the hydroxybenzene, in D the melting point and in E the shade of the dyestuff on synthetic polyamide fibers.

*Table I*

| Ex. No. | A | B | C | D | E |
|---|---|---|---|---|---|
| 2 | 1-amino-4-dimethyl-amino-sulfonyl-amino-benzene. | 1-amino-3-methylbenzene. | hydroxybenzene. | Degrees 160-2 | reddish yellow. |
| 3 | ----do---- | 1-amino-3,6-dimethyl-benzene. | ---do---- | 208 | Do |
| 4 | ----do---- | 1-amino-3-acetylamino-benzene. | ---do---- | 246-7 | orange. |
| 5 | ----do---- | 1-amino-3-methylsulfonylamino-benzene. | ---do---- | 216-7 | Do |
| 6 | 1-amino-4-dimethyl-amino sulfonylamino-6-chlorobenzene. | 1-amino-3,6-dimethyl-benzene. | ---do---- | 210-211 | Do |
| 7 | 1-amine-3-dimethyl-amino sulfonyl-aminobenzene. | 1-amino-3-methyl-benzene. | ---do---- | 158-9 | reddish yellow. |
| 8 | 1-amino-3-dimethyl-aminosulfonyl-aminobenzene. | 1-amino-3,6-dimethyl-benzene. | ---do---- | 177-9 | orange. |
| 9 | 1-amino-3-dimethyl-aminosulfonyl-amino-6-chloro-benzene. | ----do---- | ---do---- | 208-210 | Do |

*Table II*

| Ex. No. | A | B | C | E |
|---|---|---|---|---|
| 10 | 1-amino-4-dimethyl-aminosulfonyl-amino-2-methyl-benzene. | 1-amino-2-ethoxy-5-methylbenzene. | 1-hydroxy-3-methyl-benzene. | orange. |
| 11 | 1-amino-4-dimethyl-aminosulfonyl-amino-3-methoxy-benzene. | 1-amino-2-methoxy-5-methylbenzene. | 1-hydroxy-3-methoxy-benzene. | reddish orange. |
| 12 | 1-amino-4-dimethyl-aminosulfonyl-amino-3-ethoxybenzene. | 1-amino-2,5-di-methoxy-benzene. | 1-hydroxy-3-ethoxy-benzene. | Do. |
| 13 | 1-amino-4-dimethyl-aminosulfonyl-amino-benzene. | 1-amino-3-propionylamino-benzene. | 1-hydroxy-benzene. | orange. |
| 14 | ----do---- | 1-amino-3-carbethoxy-amino-benzene. | ----do---- | Do. |
| 15 | ----do---- | 1-amino-3-carbomethoxy-amino-benzene. | 1-hydroxy-2-methyl-benzene. | Do. |
| 16 | ----do---- | 1-amino-2,5-di-methyl-benzene. | 1-hydroxy-2-chloro-benzene. | Do. |

Formulae of the representative dyestuffs of the foregoing examples are as follows:

*Example 1*

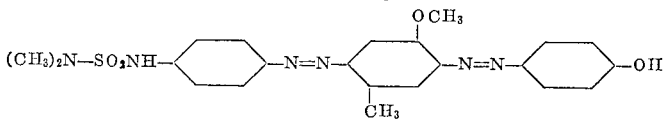

*Example 2*

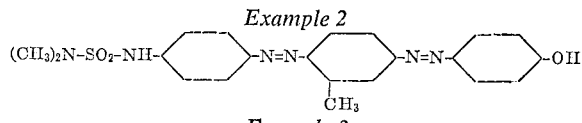

*Example 3*

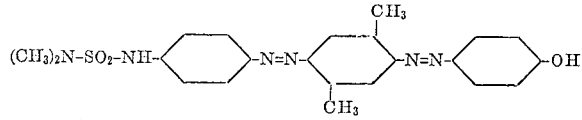

Having thus disclosed the invention what we claim is:
1. Compound of the formula

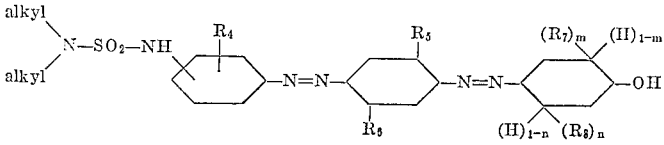

wherein $R_4$ is a member selected from the group consisting of hydrogen, chlorine, lower alkyl and lower alkoxy, $R_5$ is a member selected from the group consisting of hydrogen, lower alkyl and lower alkoxy, $R_6$ is a member selected from the group consisting of hydrogen, lower alkyl, lower alkoxy, lower alkanoylamino, lower carbalkoxyamino and lower alkylsulfonylamino, $R_7$ is a member selected from the group consisting of hydrogen, chlorine and lower alkyl, $R_8$ is a member selected from the group consisting of hydrogen, lower alkyl and lower alkoxy, and alkyl is alkyl radical containing 1 to 4 carbon atoms and, $n$ and $m$ are one of the integers 0 and 1, $n$ plus $m$ being at most 1.

2. The disazo dye corresponding to the formula
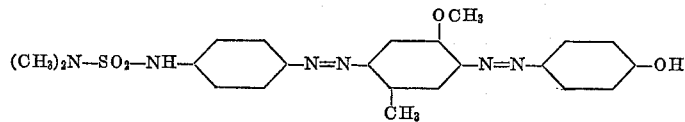
3. The disazo dye corresponding to the formula
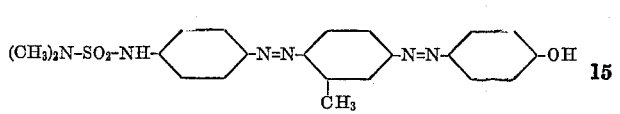
4. The disazo dye corresponding to the formula
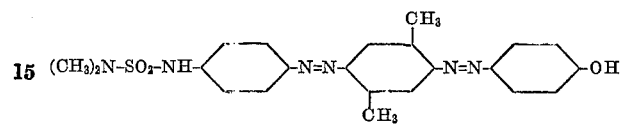
References Cited in the file of this patent
UNITED STATES PATENTS
2,909,515    Ruckstuhl et al. _____ Oct. 20, 1959